US006578080B1

(12) United States Patent
Dwork (10) Patent No.: US 6,578,080 B1
(45) Date of Patent: Jun. 10, 2003

(54) MECHANISM FOR RUN TIME PROGRAMMING OF HARDWARE RESOURCES WITH LEAST INTERFERENCE WITH CONTINUED OPERATION

(75) Inventor: Jeffrey Roy Dwork, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/244,431

(22) Filed: Feb. 4, 1999

(51) Int. Cl.[7] .............................................. G06F 15/16
(52) U.S. Cl. ....................................... 709/229; 709/227
(58) Field of Search ................................ 709/227, 217, 709/220, 229, 311, 295

(56) References Cited

U.S. PATENT DOCUMENTS

| | | | | |
|---|---|---|---|---|
| 5,548,649 A | * | 8/1996 | Jacobson | 380/49 |
| 5,590,285 A | * | 12/1996 | Krause et al. | 395/200.2 |
| 5,796,944 A | * | 8/1998 | Hill et al. | 395/200.8 |
| 6,233,234 B1 | * | 5/2001 | Curry et al. | 370/356 |

* cited by examiner

Primary Examiner—Glenton B. Burgess
Assistant Examiner—Tod Kupstas (57) ABSTRACT

An apparatus for programming selected entries in an address filter table allows dynamic updating of address registers and eliminates the need to disable unmodified registers in arrangements including multiple registers or entries. The apparatus comprises an interface for receiving data frames from a remote station. A media access controller is provided with an address filter table capable of storing a plurality of entries. Each entry includes an address field for storing a predetermined target address, and an enable field for indicating whether or not the entry is valid. The media access controller is configured to receive each of the data frames from the interface. The media access controller examines the enable field of each entry in the address filter table to determine whether or not the entry is valid. The received data frames are then routed to a destination address based upon the target addresses stored in the address filter table. A device manager may be used for updating the entries in the address filter table.

11 Claims, 7 Drawing Sheets

MECHANISM FOR RUN TIME PROGRAMMING OF HARDWARE RESOURCES WITH LEAST INTERFERENCE WITH CONTINUED OPERATION

BACKGROUND OF THE INVENTION

1. Technical Field

The present invention relates to network interfacing and more particularly to an apparatus and method for programming hardware resources of a network interface.

2. Background Art

Network interfacing devices are commonly used to transmit data between a host computer and network communication systems, such as a Local Area Network (LAN). One primary function of a network interface is to selectively receive data from a remote workstation. The data may also be received from other network devices such as servers, routing stations (routers), etc. Ideally, data is selected by the network interface based on a match between a destination address associated with the data and a predetermined target address associated with the network interface.

Network interfaces typically include at least one register, or memory device, to store the target addresses corresponding to specific workstations. Hence, the target addresses may be used to selectively receive or route data. The register can be programmed by hardware associated with the network interface or the host workstation. Alternatively, the register can be programmed by software executed in the memory of the host workstation.

In operation, the network interface receives one or more data frames, each of which includes a destination address, from a remote workstation or network device. The destination address of each data frame is compared to the target address (or addressees) stored in the register. If the destination address of the data frame matches one of the target addresses stored in the register, then the network interface accepts and transfers the data frame to the data bus of the workstation. If the destination address of the data frame does not match any target address stored in the register, then the network interface ignores the data frame.

In large network systems, such as Wide Area Networks (WANs) or the Internet, routers are used to direct data frames to subsequent routers and/or workstations. Routers typically include a table for storing a plurality of target address values. During routing operations, the destination addresses of incoming data frames are compared to the target address values stored in the table in order to determine the most efficient path for routing each data frame. Many routers are also configured to transmit statistical information regarding traffic density along various routes. The statistical information is used to update the target address values stored in the table. Hence, the target addresses stored in the table are dynamically updated based on traffic density and the distance to a subsequent workstation or router.

Routers typically include a Central Processing Unit (CPU) or functional control circuit to handle dynamic updating of target addresses stored in the table. During a given update procedure, one or more of the target addresses will be changed. Regardless of the number of entries being updated, all entries in the table are invalidated during the update procedure. Hence, in the instance where only one target address must be updated, routing functions associated with all other target addresses in the table must be suspended. Consequently, numerous data frames may be lost and routing time is increased.

In certain situations, it is necessary for a router or workstation to recognize the destination address or header information contained in a data frame from an external network in order to maintain operational efficiency. There currently exists several protocols to transfer data within and between different networks. For example, many LANs and WANs utilize the Internet Packet Exchange (IPX) protocol to deliver data. Intranets and the Internet utilize a protocol known as TCP/IP. TCP/IP is actually a combination of two protocols (Transmission Control Protocol and Internet Protocol) that work together to deliver data. Each type of network includes multiple layers for manipulating data from an application prior to transmission over a physical link. Each layer encapsulates a header containing various information, such as control information and address information, into the data frames transmitted. Accordingly, routing and transmission of data frames may be optimized by a network interface capable of examining multiple headers within a data frame.

A primary disadvantage associated with current methods of selectively receiving and routing data is the period of inactivity associated with the updating of address registers in a workstation or router. Another disadvantage associated with current methods of selectively receiving and routing data is the inability to independently modify individual target addresses in a routing table. A further disadvantage associated with current methods of selectively receiving and routing data frames is the inability to examine information encapsulated within various headers in the data frame.

SUMMARY OF THE INVENTION

There is a need for methods and apparatus for programming target address entries in a network interface and which can selectively update individual target addresses in a routing table.

These and other needs are attained by the present invention, wherein an address register or an entry in an address filter table includes a field for indicating whether the address register or entry is available for use in routing received data frames, thereby eliminating the need to disable unmodified registers.

In accordance with an aspect of the present invention, an apparatus for runtime programming of hardware resources in a network interface comprises: an interface configured to receive data frames from a remote station, each of the data frames including a header and a destination address contained in the header; a media access controller including an address filter table for storing a plurality of entries, each entry including an address field for storing a target address value, an enable field for indicating the validity of the entry, and logic for preventing access to invalid entries; and a device manager for updating the entries. The media access controller is configured to compare the destination address of each received data frame to the target addresses stored in valid entries of the address filter table, and route each received data frame to its associated destination address. In preferred embodiments of the invention, the media access controller may be further configured to invalidate the enable field upon detecting an update operation by the device manager, and validate the enable field upon detecting completion of the update operation. The enable field allows dynamic updating of individual entries in the address filter table without interfering with routing operations performed using the remaining entries.

According to another aspect of the invention, a method of programming hardware resources in a network interface comprises the steps: selecting an entry within an address filter table containing a plurality of entries; writing a predetermined value into at least one field contained in the selected entry; detecting initiation of the writing step; invalidating an enable field contained in the selected entry to prevent access to the selected entry during routing operations; detecting completion of the writing step; and validating the enable field contained in the selected entry to allow access to the selected entry during routing operations. The present invention allows efficient updating of entries in the address table regardless of the number of data transfers required to update the entry. Hence, individual entries may be updated without interrupting continued operation on remaining entries by invalidating the enable field at the commencement of the write operation.

Additional objects, advantages, and novel features of the present invention will be set forth in part in the description which follows, and in part will become apparent to those skilled in the art upon examination of the following or may be learned by practice of the invention. The objects and advantages of the invention may be realized and attained by means of the instrumalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENT

The present invention will be described with the example of a network interface in a packet switched network, such as an Ethernet (IEEE 802.3) network. A description will first be given of a network interface architecture, followed by the arrangement for programming hardware resources in the network interface using an enable field to indicate whether a particular target address may be utilized in routing and receiving operations. It will become apparent, however, that the present invention is also applicable to other network interface systems.

Figures 1, 1A:
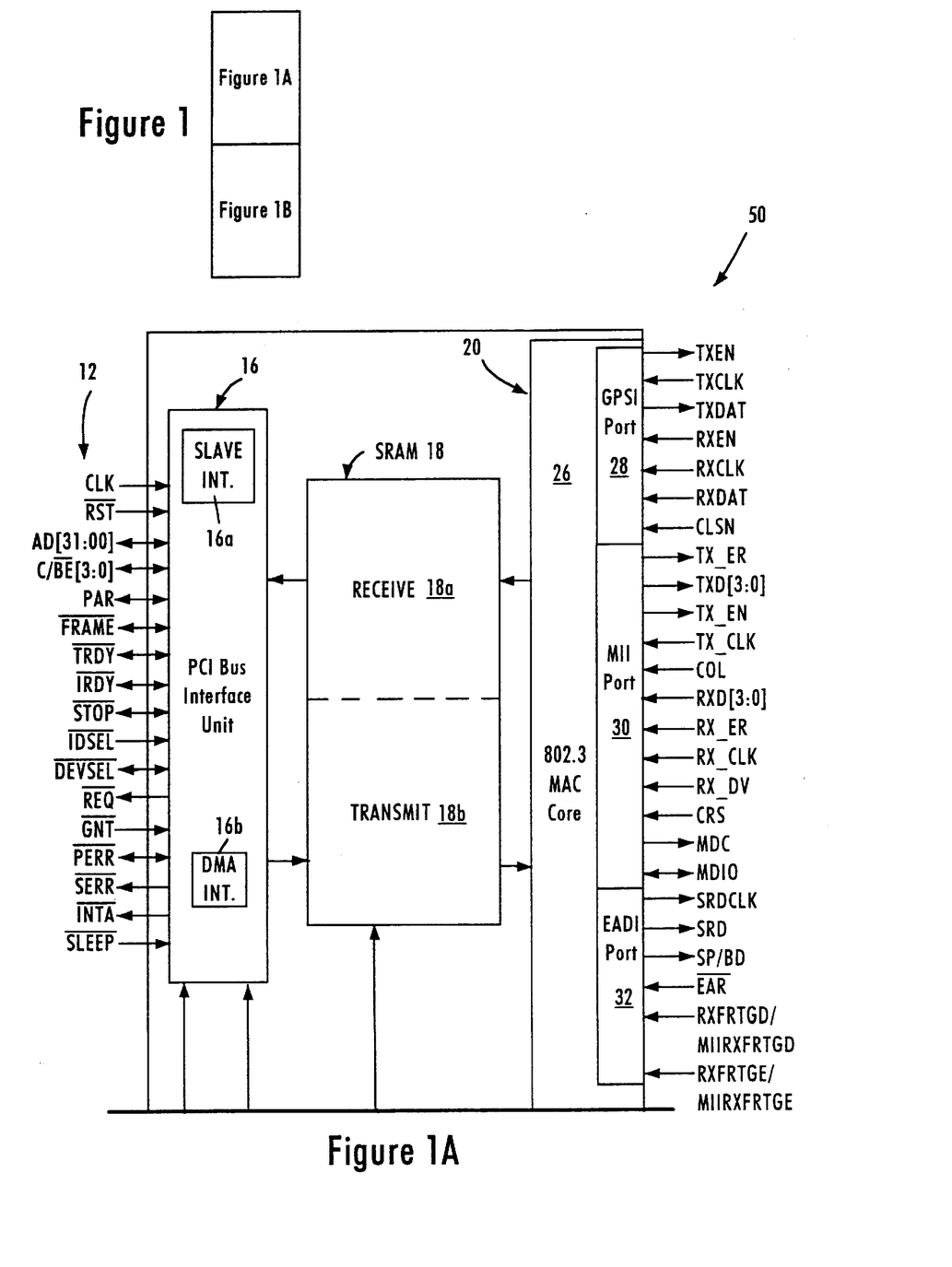
FIG. 1 is a block diagram illustrating a network interface for selectively receiving data frames from a remote source according to an embodiment of the present invention.
Figure 1B:
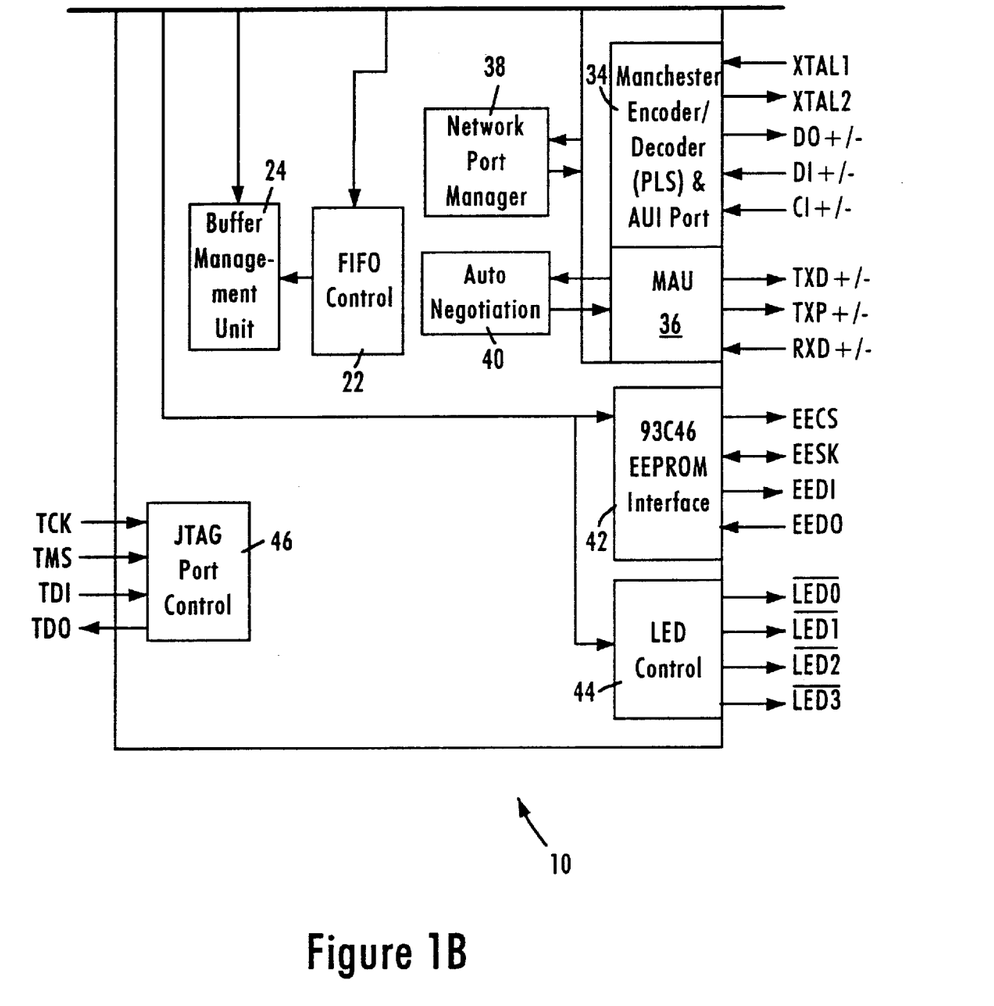

FIG. 1 is a block diagram of an exemplary network interface 10 that accesses the media of an Ethernet (ANSI/IEEE 802.3) network according to an embodiment of the present invention.

The network interface 10, for example a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a direct memory access (DMA) interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 32 bit static random access memory (SRAM) implemented directly on the network interface chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit (MMU) 52 controlling all transfers of data to and from the memory unit 18, as seen with additional reference to FIG. 2.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown) will be programmed with configuration information related to the network interface 10, enabling the network interface 10 to be configured during initialization via the EEPROM interface 42. Once initialized, the network interface 10 stores the configuration information in internal registers (not shown), enabling the network interface 10 to operate independently of the host computer in the event the host computer is powered down. Hence, the network interface 10 can be configured to operate while the host computer is in a stand-by mode, enabling the network interface 10 to output power up information to logic within the host computer to enable the host computer to automatically turn on in response to data frames received from the network and having a specific protocol, described below.

Figure 2:
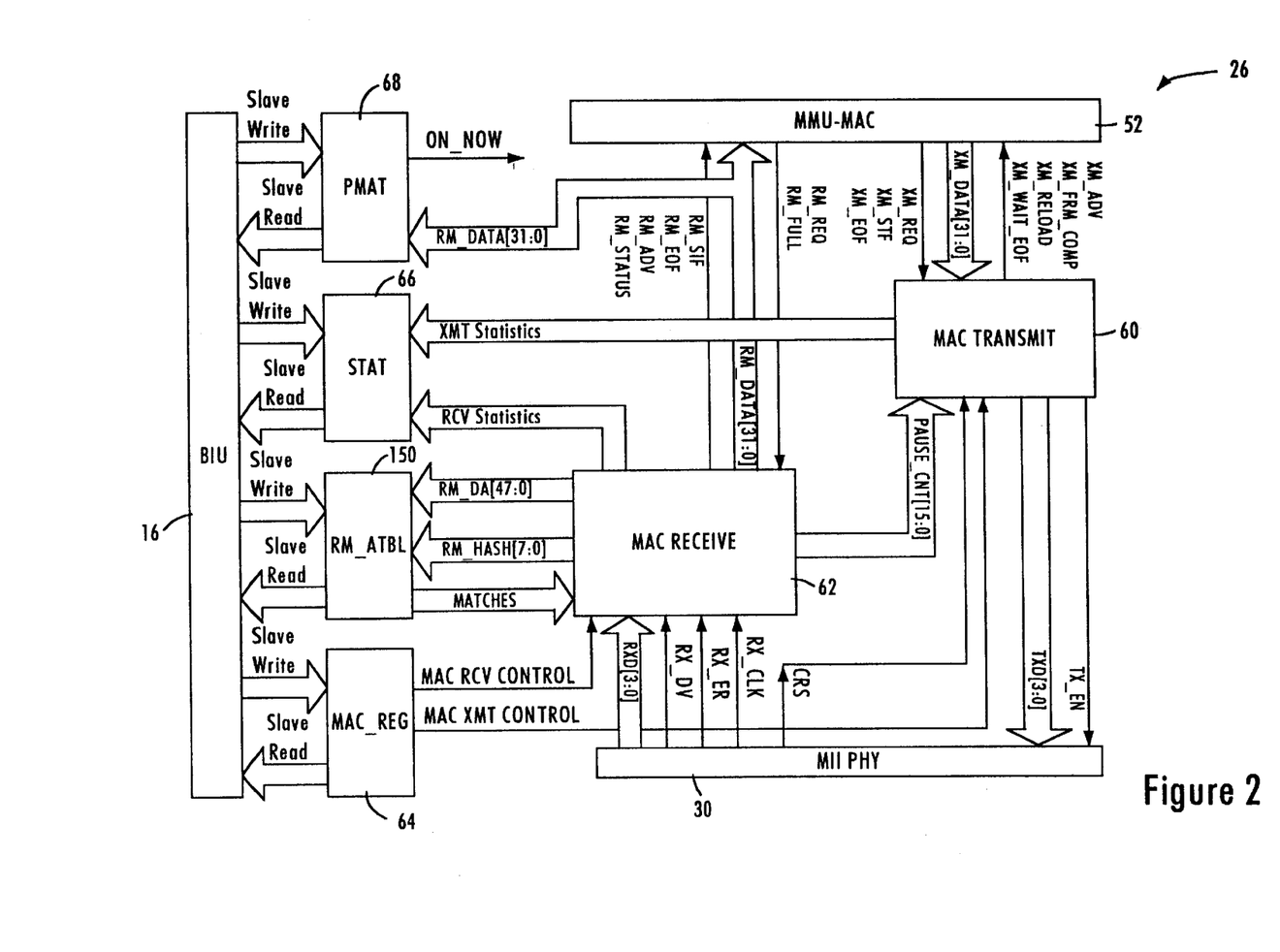
FIG. 2 is a block diagram illustrating the media access control block of the network interface of FIG. 1.

FIG. 2 is a block diagram of the Media Access Control (MAC) core 26 of the network interface 10. The MAC 26 includes a transmit control block (XM_MAC) 60, a receive control block (RM_MAC) 62, a register control block (MAC_REG) 64, a statistics block (STAT) 66, a pattern matching block (PMAT) 68, and an address filter table 150 (RM_ATBL). The MAC 26 implements the required network protocol and provides an interface between the MMU 52 and the physical link via the MII interface 30. While the MAC 26 may be configured to implement multiple network protocols, the standard implementation is IEEE 802.3. The MII interface 30 implements a standard protocol which is IEEE 802.3u compliant.

The MAC 26 operates on several clocks that are independent of one another. The register control block (MAC_REG) 64 operates on a bus clock (BCLK) in order to allow synchronous access by the BIU 16. The MAC 26 must synchronize the outputs of associated registers to one of three clocks, namely a transmit clock (XMCLK), a receive clock (RMCLK), or a 25 MHz clock (CLK_25MHZ). Hence, access is allowed throughout operation of the MAC 26. The transmit clock (XMCLK) and the receive clock (RMCLK) are both buffered by the MII interface 30. Accordingly, there are no transmit clock (XMCLK) or receive clock (RMCLK) transitions unless there is a physical connection to the MII interface 30.

The transmit control block (XM_MAC) 60 implements transmit operations of the MAC core 26, as well as a transmission medium arbitration logic. The transmit control block (XM$_{13}$ MAC) 60 also generates flow control frames during transmit operations. Hence, the transmit control block (XM$_{13}$ MAC) 60 accepts data frames from the MMU 52 and transmits them to the physical link via the MII interface 30. The data frames transmitted from the MMU 52 may also include control information following the last word of data. The transmitted data frames may be in the form of SRAM data frames or MAC flow control frames. The control information transmitted by the MMU 52 includes the number of bytes contained in the last data word. The transmit control block (XM_MAC) 60 receives a send command from the network interface 10, which causes the transmit logic to send the flow control frame as the next subsequent data frame. The transmit logic must await completion of any transmit operations currently underway. Additionally, the transmit logic sends the flow control frame ahead of any data frames that may be queued in the MMU 52. The transmit control block (XM_MAC) 60 also implements standard transmit features such as "retry on collision", frame check sequence (FCS) generation and transmission, and pad field insertion. Additionally, the transmit control block (XM_MAC) 60 may implement automatic retransmission of data frames upon detecting errors such as retry and underflow. Hence, the transmit block (XM_MAC) 60 provides flexible and reliable transmission of data frames from the MMU 52 to the physical link via the MII interface 30.

The receive control block (RM_MAC) 62 implements all receive operations of the MAC 26. The receive control block (RM_MAC) 62 accepts data frames from the physical link via the MII interface 30 and transfers the data frames to the MMU 52. The receive control block (RM_MAC) 62 also contains logic for implementing flow control frame recognition functions. Additionally, the receive control block (RM_MAC) 62 implements the address filter table 90 for storing one or more target address values. Data received from the MII interface 30 is in the form of serial nibble data, and must be converted to 32-bit wide segments by the receive control block (RM_MAC) 62. Each 32-bit wide segment, or double word (DWORD), of the data frame is subsequently output to the MMU 52.

Additionally, the nibble data is examined by the receive control block (RM_MAC) 62 to determine if the incoming frame data has a bad frame check sequence. The receive control block (RM_MAC) 62 compares a predetermined byte sequence of received data frames with address values stored in one or more address registers, or the target address values stored in the address filter table 90 in order to determine whether the destination address of the received data frame matches the value stored in the address register (i.e., the target address values). The receive control block (RM_MAC) 62 then outputs the result to the MMU 52, which in turn, determines whether to receive, route, or ignore the data frame.

The statistics block (STAT) 66 contains transmit and receive statistics counters and registers, and operates on the 25 MHz clock (CLK$_{13}$ 25MHZ). Statistics information is transmitted to the STAT block 66 upon successful transmission of each data frame. The transmit control block (XM_MAC) 60 is used to output the results of the previous transmit operation to various registers in the STAT block 66, and performs updates only at the end of each transmission. Hence, the statistics pertaining to a data frame are valid until transmission of the next data frame is complete. The transmit control block (XM_MAC) 60 also increments the value stored in the transmit statistics counters upon successful transmission of each data frame. Similarly, the receive control block (RM_MAC) 62 outputs the results of the previous receive operation to registers contained in the STAT block 66, and performs updates upon successful reception of each data frame. The receive control block (RM_MAC) 62 also increments the value stored in the transmit statistics counters upon successful reception of each data frame.

Figure 3:
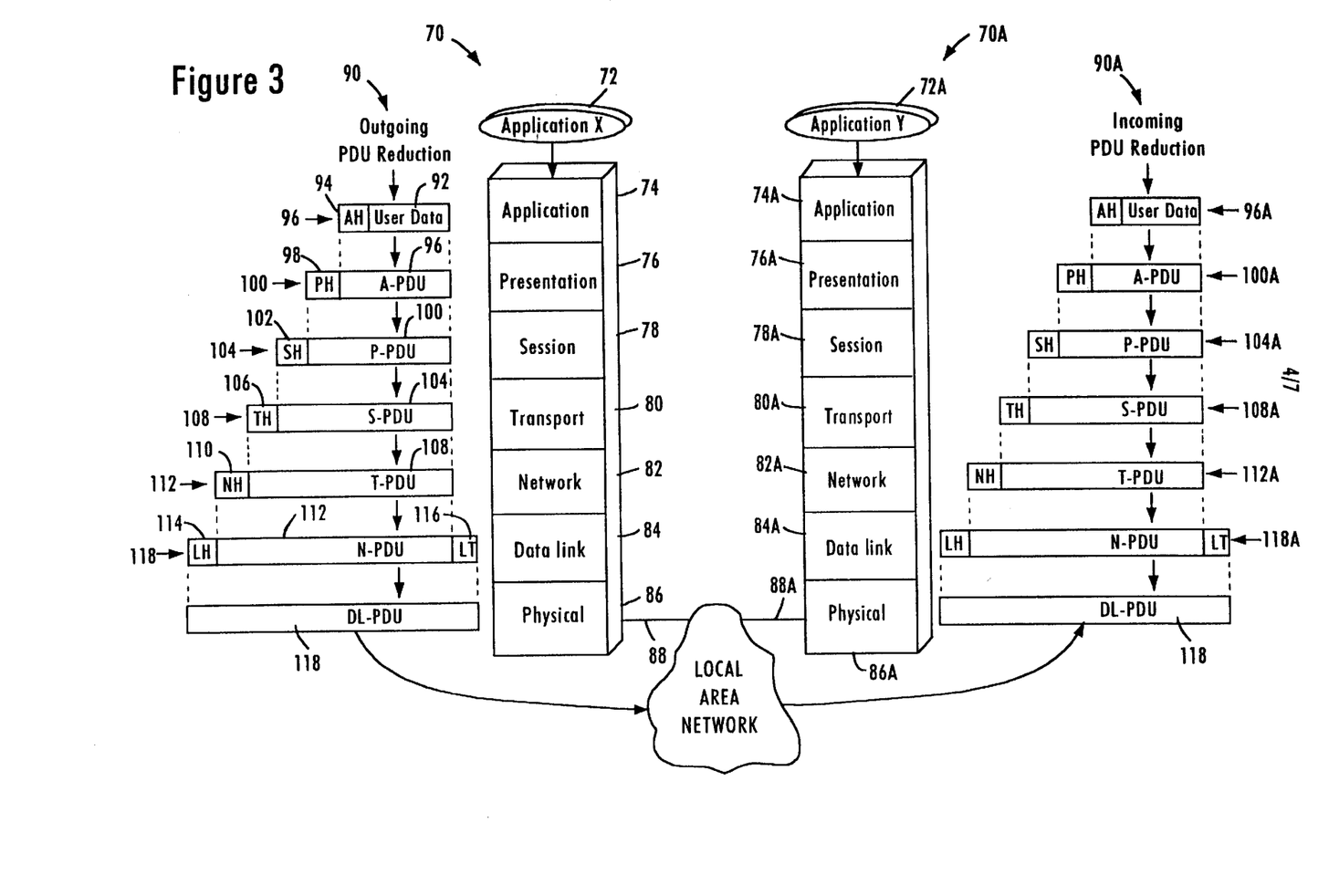
FIG. 3 is a block diagram illustrating the OSI standard model for a network architecture.

FIG. 3 illustrates the OSI reference model used as a standard for developing network protocols. FIG. 3 details how the OSI reference model may be used to interconnect a first workstation 70 to a second workstation 70A and transfer data therebetween. In order to transfer data between the two workstations 70, 70A, a first user executes a first application 72A in the memory of the first workstation 70. Similarly, a second user executes a second application 72A in the memory of the second workstation 70A. For example, a popular type of application used to transfer information between users is an Internet browser (web browser). Another such application is an electronic messaging system, commonly referred to as e-mail. Both applications allow users to input or attach various messages and/or program files that can be subsequently transferred over a network (i.e., a LAN) to a remote user.

The OSI reference model consists of seven layers, namely: an application layer 74, 74A; a presentation layer 76, 76A: a session layer 78, 78A: a transport layer 80, 80A: a network layer 82, 82A: a data link layer 84, 84A: and a physical layer 86, 86A. The application layer 74 provides the necessary interface which allows the first application 70 to access the OSI environment. The application layer 74 contains various management functions and general mechanisms that are useful in supporting distributed applications. For example, the mechanisms required to support electronic mail and web browsing are often implemented within the application layer 74. The presentation layer 76 defines the format in which data will be exchanged between applications. The presentation layer 76 also defines the syntax that will be used between application entities during the data transfer phase. For example, the presentation layer 76 is responsible for providing specific services such as data compression and data encryption.

The session layer 78 provides the necessary mechanism for controlling dialog between applications in two different systems. One key service provided by the session layer 78 is the type of dialog that will be established between the first workstation 70 and the second workstation 70A. This dialog can be, for example, two-way simultaneous (open full duplex), two-way alternate (open half duplex), or closed. The session layer 78 can also implement checkpointing mechanisms in order to provide data recovery services if a failure occurs between checkpoints. The transport layer 80 provides data recovery services and the mechanism necessary to exchange data between the first workstation 70 and the second workstation 70A. The transport layer 80 is responsible for assuring that data is delivered error free, and with no losses or duplication. The network layer 82 provides the mechanism for transferring information between the first workstation 70 and the second workstation 70A across a particular communication network. The network layer 82 provides this service in a transparent manner such that the upper level layers are oblivious to the type of data transmission and switching technologies used to connect the first workstation 70 to the second workstation 70A. The network layer 82 is also responsible for segmenting and re-assembling data received from the transport layer 80 and the data link layer 84, respectively. Specific services provided by the network layer 82 include flow control and routing functions. The data link layer 84 provides the mechanism necessary to ensure orderly and correct deliver of data frames between the two workstations 70, 70A. The data link layer 84 typically implements an error control protocol such-as-stop and wait or go-back-N. The physical layer 86 implements the necessary protocols to interface the workstation 70 to the physical medium 88, 88a which will be used to transmit the data, for example a standard twisted pair wire having an RJ-45 connector or a coaxial cable having a BNC connector.

Data entered by a user through an application interface is passed between each layer until it can be transmitted to the next workstation. The data is entered by the user via an alphanumeric input device such as a keyboard (not shown) .and transferred to the application layer 74 in the form of user data 92. The application layer 74 attaches a header 94 to the user data 92 in order to create an application protocol data unit (PDU) 96. The application-PDU 96 is transferred from the application layer 74 to the presentation layer 76. The presentation layer attaches a presentation header 98 to the application-PDU 96 to form a presentation-PDU 100. The presentation-PDU 100 is transferred from the presentation layer 76 to the session layer 78. The session layer 76 attaches a session header 102 to the presentation-PDU 100 to form a session-PDU 104. The session-PDU 104 is transferred to the transport layer 80, where a transport header 106 is attached to form a transport-PDU 108. The transport-PDU 108 is transferred from the transport layer 80 to the network layer 82. The network layer 82 attaches a network header 110 to the transport-PDU 108 to form a network PDU 112 which is transferred to the data link layer 84. The data link layer 84 attaches a data link header 114 and a data link trailer 116 to the network-PDU 112 to form a data link-PDU 118. The data link-PDU 118 is transferred to the physical layer 86 where it is converted into a binary bit stream and transferred across the physical medium 88.

At the second workstation 70A, a second physical medium 88A receives the binary bit stream and transfers it to the second physical layer 86A. The second physical layer 86A receives the identical data link-PDU 118 transferred from the first workstation 70. The second physical layer 86A transfers the received data link-PDU 118 to the second data link layer 84A. The second data link layer 84A strips the link header 114 and the link trailer 116 from the data link-PDU 118 to form a network-PDU 112. The network-PDU 112 is then transmitted to the second network layer 82A. The second network layer 82A strips the network header 110 from the network-PDU 112 and transmits a transport-PDU 108 to the second transport layer 80A. The second transport layer 80A strips the transport header 106 from the transport-PDU 108 and transfers a session-PDU 104 to the second session layer 78A. The second session layer 78A strips the session header 102 from the session-PDU 104 and transfers a presentation-PDU 100 to the second presentation layer 76A. The second presentation layer 76A strips the presentation header 98 from the presentation-PDU 100 and transfers an application-PDU 96 to the second application layer 74A. The second application layer 74A strips the application header 94 from the application-PDU and transfers the original data to the second user application 72A.

Figure 4:
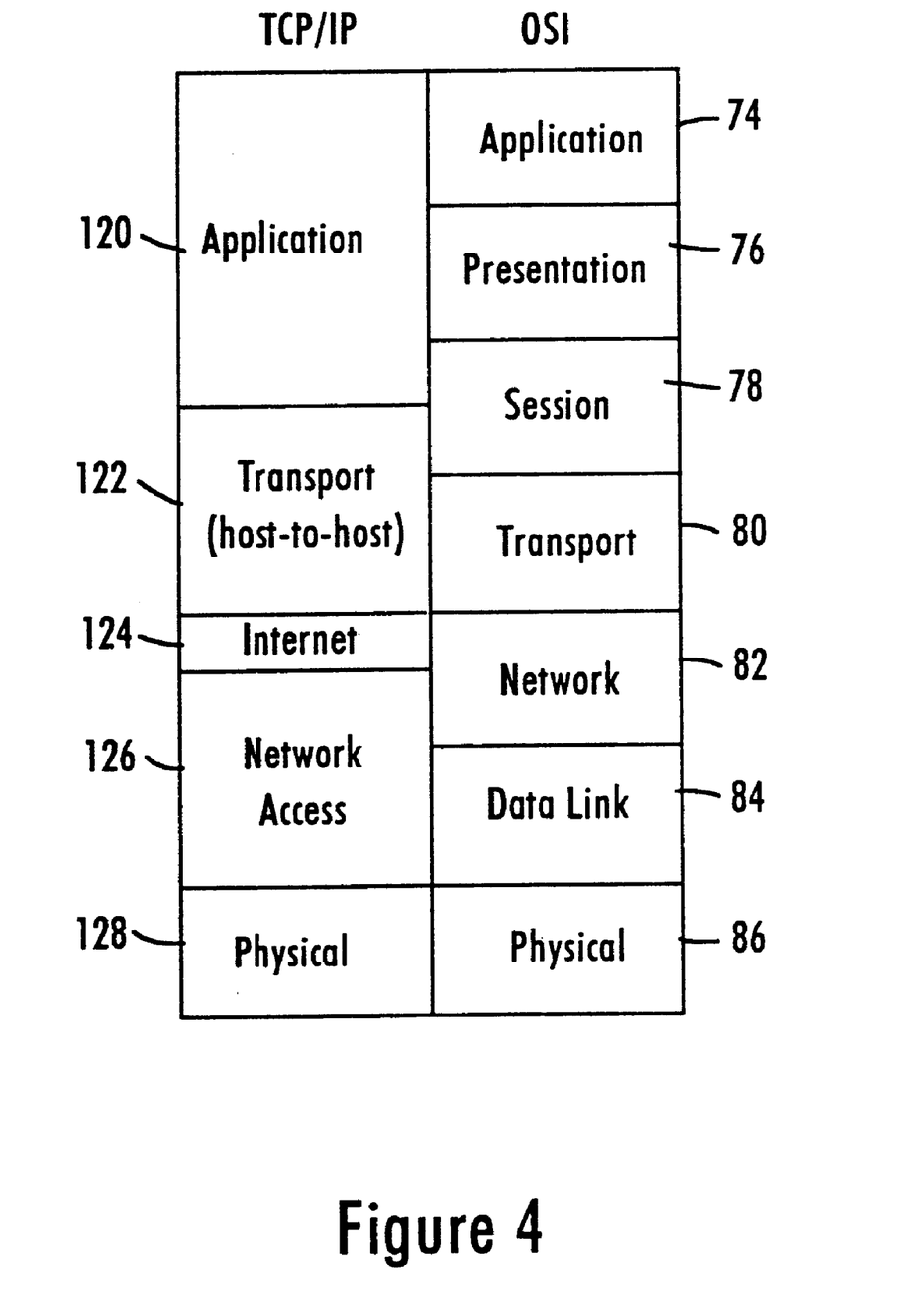
FIG. 4 is a block diagram illustrating the differences between TCP/IP and the OSI reference model.

The OSI reference model described with reference to FIG. 3 forms the foundation upon which most networking protocols are designed and implemented. According to the exemplary disclosed embodiment, the networking protocol implemented by the MAC 26 is OSI compliant. For example, the MAC 26 may be configured to implement either the IPX or TCP/IP protocols, both of which are OSI compliant. FIG. 4 illustrates the differences between the TCP/IP Protocol and the OSI reference model. According to the TCP/IP protocol, the upper three layers of the OSI model (application 74, presentation 76, and session 78) are combined into a single application layer 120. A transport layer 122 (or TCP layer) provides the necessary communication between applications on different workstations. The internet layer 124 routes data transferred from the transport layer 122 through the network. The network access layer 126 controls the transfer of data across the logical interfaces used to connect the two workstations. The physical layer 128 defines the characteristics for transmitting data over the physical medium.

Figure 5:
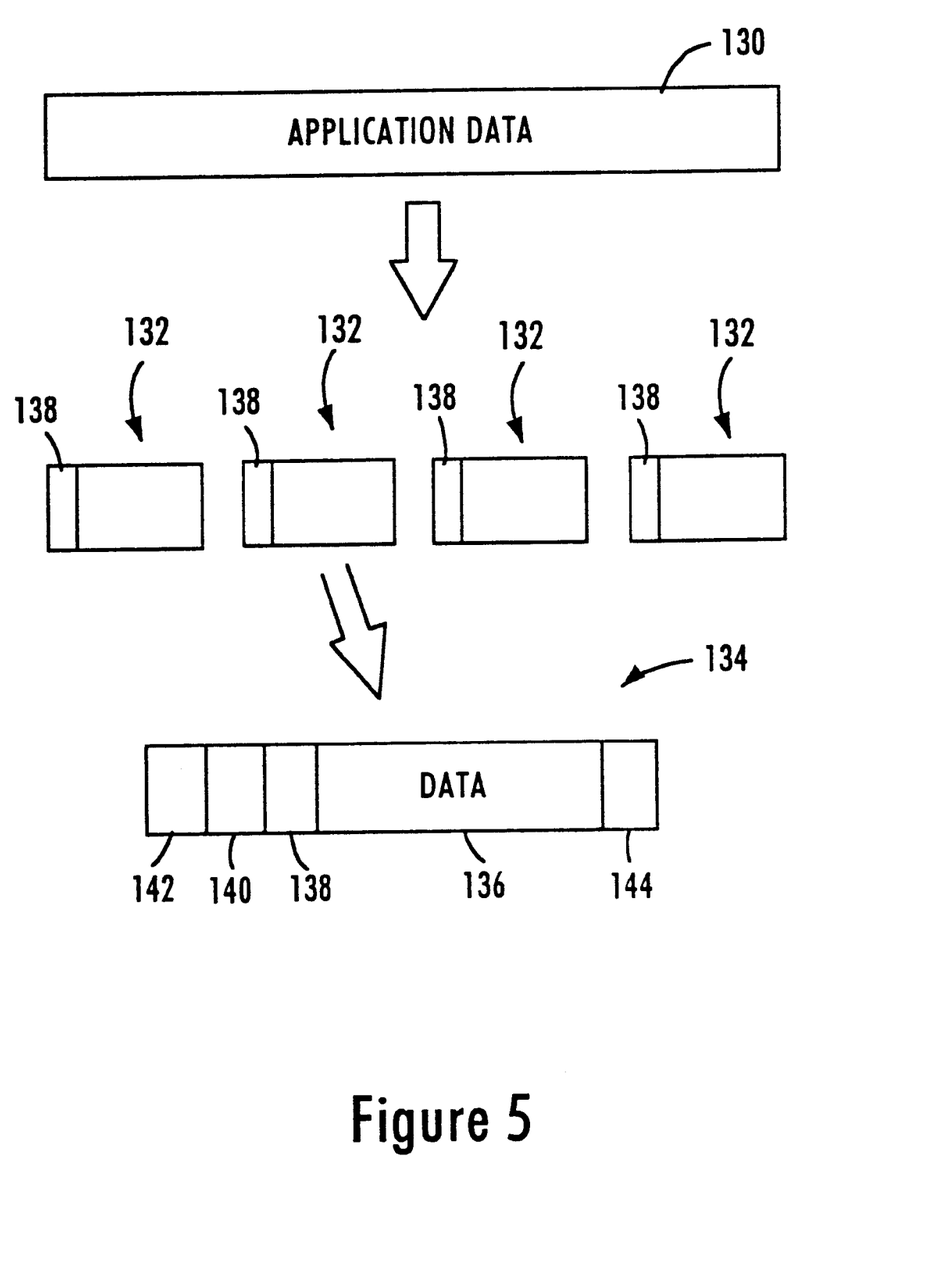
FIG. 5 is a block diagram illustrating segmentation of user data and the structure data frames received by the network interface of FIG. 1.

FIG. 5 illustrates segmentation of data and the structure of a typical data frame according to one embodiment of the present invention. Application data 130 is input by a user for transmission over a network. The TCP layer 122 receives and divides the application data 130 into multiple segments 132 and adds a TCP header 138 to each segment 132. The TCP layer 122 then submits the segment 132 to the internet layer 12. The internet layer 124 appends an IP header 140 to each data segment 132 received. The IP header 140 includes information such as the sending and destination addresses of the data segment 132, the length of the data segment 132, and the sequence number of the data segment 132. The data segment 132 is the submitted to the network access layer 126.

The network access layer 126 implements transmission protocols such as the Point-to-Point Protocol (PPP). The network access layer 126 creates a data frame 134 by appending a network access header 142 and a network access trailer 144 to the data segment 132 received from the internet layer 124. Hence, each data frame 134 includes a data portion 136, a TCP header 138, an IP header 140, a network access header 142, and a network access trailer 144. The network access header 142 includes information such as a Cyclic Redundancy Check (CRC) value to detect errors after the data frame 134 is transmitted to a subsequent station. The data frames 134 are then submitted to the physical layer 128, (i.e., the Mul interface 30) for implementing the Ethernet specification (i.e., IEEE 802.3u). The physical layer 128 translates the source and destination addresses encapsulated within the data frame 134 into appropriate hardware addresses, for example, a standard Ethernet address or a MAC address, necessary to deliver the data frame 134. Each header in the data frame 134 includes sufficient control information for reassembling the received data frames 134 into the original data transmitted via the user application.

Figure 6:
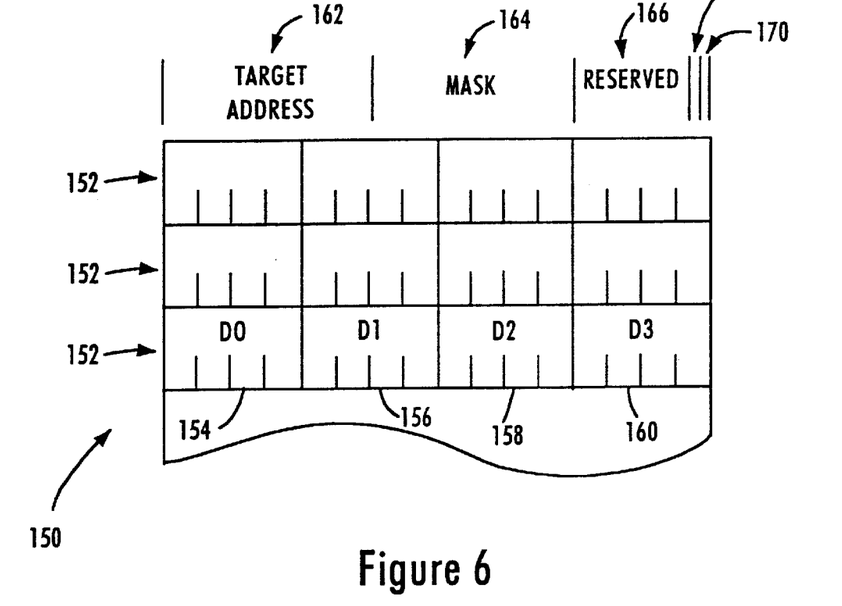
FIG. 6 is a block diagram illustrating the structure of an address filter table according to the present invention.

FIG. 6 illustrates the structure of an exemplary address filter table 150 according to an embodiment of the present invention. The address filter table 150 is implemented in the receive control block (RM_MAC) 62 of the MAC 26 (see FIG. 2). The address filter table 150 is capable of storing a plurality of entries 152. In the exemplary embodiment of FIG. 6, each entry 152 in the address filter table 150 has four 32-bit DWORDs. The first DWORD (D0) 154 corresponds to the first four bytes of address data. The second DWORD (D1) 156 corresponds to the last two bytes of address data, and the first 2 bytes of mask data. The third DWORD (D2) 158 corresponds to the last four bytes of mask data. Hence, each entry 152 includes an address field 162 for storing a predetermined target address, and a mask field 164 for storing address mask information. The last DWORD (D3) 160 includes a reserved field 166, a perfect match field 168, and an enable field 170.

The address data stored in the address field 162 of each entry 152 corresponds to a "perfect" address value, or target address for use in filtering destination addresses contained in received data frames 134. The target addresses may include, for example, any mixture of unicast (single destination) and multicast (multiple destination) addresses. Each entry 152 includes an address mask corresponding to each of the target addresses in order to perform multicast address comparisons. Accordingly, a logical one in any bit of an address mask indicates that the corresponding bit in the associated target address is ignored for purposes of address matching. For example, if the target address in entry #2 of the address filter table 150 contains a value of 07-01-02-03-45-67 and the corresponding mask field 164 contains a value of 00-00-00-00-00-11, then received data frames 134 having a destination address ranging from 07-01-02-03-45-00 to 07-01-02-03-45-FF will be accepted or routed.

The destination address of each incoming data frame 134 is compared with valid entries 152 (i.e., those entries whose enable fields contain a value of 1) for a possible match. If the enable field 170 is invalid, i.e., contains a value of 0, then the entry 152 is ignored. If the comparison indicates that the destination address of an incoming data frame 134 identically matches the target address of an entry 152 in the address filter table 150, then the content of the perfect match field 168 for that entry is set to 1.

If one of the entries 152 in the address filter table 150 has several of its mask bits set so that the entry 152 refers to a range of addresses, a device manager 212 (see FIG. 7) may be configured to use the perfect match field 168 for indicating whether or not the destination address of the incoming data frame 134 has been filtered, i.e., routed based on a range of addresses as opposed to one individual address.

Furthermore, the device manager 212 is responsible for validating the perfect match field 168 in entries 152 that refer to single target addresses, and invalidating the perfect match field 168 in entries 152 that refer to a range of target addresses. The MAC 26 may be configured to detect if the perfect match field 168 is set after each comparison of an incoming data frame 134 with the target addresses. If the perfect match field 168 is set, then the MAC 26 transfers information regarding the data frame 134 to the network interface 10. The MAC 26 subsequently invalidates the perfect match field 168 prior to comparing the next received data frame 134 to entries 152 in the address filter table 150.

According to the disclosed embodiment, the target addresses and the address mask are each six (6) bytes in length, and each entry 152 is sixteen (16) bytes in length. However, the address filter table 150 may be configured to store target addresses which do not correspond to standard Ethernet addresses. In other words, the target address may be greater than or less than six bytes. In preferred embodiments, the address mask contains an equal number of bytes as the target address. Furthermore, the reserved field 166 may be used to store information necessary for specifying that non-Ethernet target addresses are being used.

Figure 7:
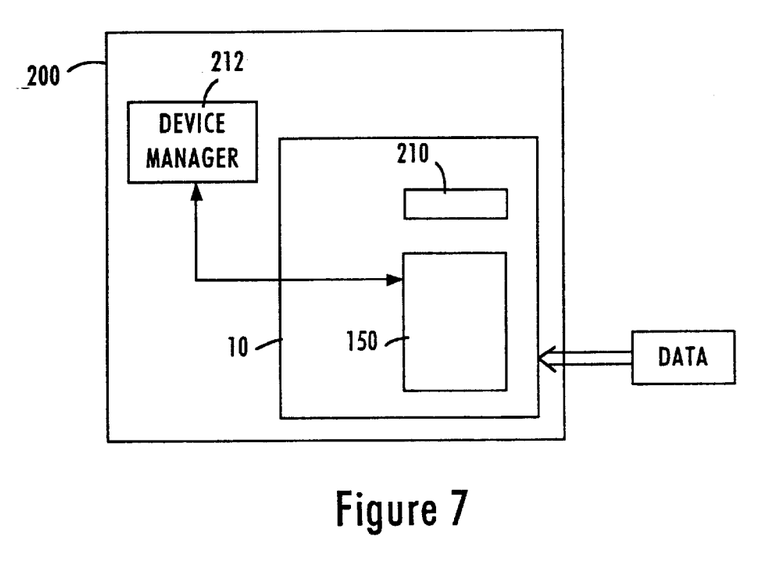
FIG. 7 is a block diagram illustrating a workstation for receiving data frames in a network.

FIG. 7 is a block diagram illustrating a station 200, such as a router or a client workstation, for selectively receiving data frames 134. The station 200 includes a network interface 10 for providing a link to a remote source, for example another workstation or router. The MII interface 30 (see FIG. 2) receives data frames 134 from the remote source via a physical link. The MII interface 30 receives information in the form of nibble data which is output to the receive control block (RM_MAC) 62 (see FIG. 2). The receive control block (RM_MAC) 62 examines the destination address of each incoming data frame 134. Each destination address is compared to target addresses stored in the address filter table 150 (see FIG. 6). Alternatively, the network interface 10 may be installed in a workstation, in which case a single register 210 may be used to determine whether the workstation will accept or ignore a received data frame 134. In such an implementation, the register 210 stores information analogous to an individual entry 152 in the address filter table 150 incoming data frames 134, however, are only compared to target addresses that are active, i.e., those target addresses corresponding to entries in which the enable field 170 is set. Therefore, the receive control block (RM_MAC) 62 must first examine the contents of each address register 210 or entry 152 in the address filter table 150 to determine if the enable field 170 is set, or valid. If the enable field 170 is valid, then the address comparison is performed. If the enable field 170 is not set, or invalid, then the address register 210 or entry 152 is ignored.

The station 200 includes a device manager 212 to update entries in the address filter table 150 to compensate for traffic congestion. The device manager 212 comprises executable program instructions in certain embodiments, and semiconductor memory devices in other embodiments. The device manager 212 analyzes information from various sources and continually updates entries 152 in the address filter table 150. Those individual entries 152 in the address filter table 150 that are in the process of being modified are invalidated and not available for use. However, only the entries that are invalidated are unavailable, as the other entries in the address filter table 150 that are valid remain available for use in routing operations. Hence, as activity on the network continues, comparisons between incoming data frames 134 and data entries 152 in the address filter table 150 can continue.

Each entry 152 in the address filter table 150 is individually updated by a series of four DWORD writes. Upon initiating a write sequence to any entry 152 in the address filter table 150, the device manager 212 locks that entry 152 so that it will not be compared with incoming data frames 134. Upon writing to the last DWORD of an entry 152, the device manager 212 unlocks the entry 152 so that it will be available for comparison with incoming data frames 134. In order to lock or unlock an entry 152 in the address filter table 150, the device manager 212 enters a value of 0 or 1, respectively, into the enable field 170 of the entry 152. Locking one entry 152 in the address filter table 150 has no effect on the remaining entries 152. Incoming data frames 134 will be compared with all entries 152 that are unlocked and enabled.

For example, if an entry 152 in the address filter table 150 is in the process of being updated, the device manager 212 will set the enable field to 0. Hence, the entry 152 becomes invalid until the enable field 170 is reset to 1. A target address will be written into the address field 162 based on predetermined conditions such as traffic congestion. In preferred embodiments of the invention, a corresponding address mask is also entered into the mask field 164. According to the exemplary embodiment, each entry 152 is sixteen bytes, although other sizes of entries 152 may be provided in different embodiments. Four write operations are therefore necessary to update an entry 152. The MAC 26 continually monitors the address filter table 150 in order to detect update operations. When an update operation is to occur, the device manager 212 initiates the first write operation to the selected entry 152. Upon detecting the first write operation, the MAC 26 immediately writes a value of 0 into the enable field 170 to prevent the selected entry 152 from being examined during routing functions. The MAC 26 is configured, in certain embodiments, to invalidate an entry 152 upon detecting a write operation to any addressable byte which does not include the enable field 170. Upon performing the last write operation, the device manager 212 writes a value of 1 into the enable field 170, indicating the entry 152 may be used in routing functions. The MAC 26, certain embodiments, is configured to write a value of 1 into the enable field 170 upon detecting completion of the write operations to the entry 152.

As previously stated, the address mask allows the network interface 10 to filter a range of destination addresses. In such instances, it is not possible to establish whether or not a received data frame 134 is accepted as a result of the filtering performed through the address filter table 150. According to one aspect of the invention, the network interface 10 determines whether or not the destination address of a received data frame 134 identically matches the target address of an entry 152. To do so, the device manager 212 compares the destination address of each received data frame 134 with the target address of the entry 152, regardless of the value stored in the address mask 164. Upon detecting an identical match, the perfect match field 168 is set. The MAC 26 monitors the value of the perfect match field 168 to detect when it is enabled. Once the MAC 26 determines a perfect match has been made, the value of the perfect match field 168 is reset to zero. Hence, there is no disruption in detecting identical matches with subsequent received data frames 134.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. Apparatus for runtime programming of hardware resources in a network interface comprising:

an interface configured to receive data frames from a remote station, each said data frame including a header and a destination address contained in said header;

a media access controller including:
   an address filter table for storing a plurality of entries, each said entry including an address field for storing a target address value and an enable field for indicating the validity of said entry, and
   logic for preventing access to invalid entries,
   said media access controller being configured to compare the destination address of each received data frame to the target address stored in valid entries of said address filter table, and route each received data frame to its associated destination address based on the comparison; and a device manager for updating individual entries in said address filter table.

2. The apparatus of claim 1 wherein said media access controller is configured to invalidate the enable field of a selected entry upon detecting an update operation by said device manager to said selected entry.

3. The apparatus of claim 2 wherein said media access controller is further configured to validate the enable field of the selected entry upon completion of the update operation by said device manager.

4. The apparatus of claim 2 wherein said device manager is configured to validate the enable field of the selected entry during said update operation.

5. The apparatus of claim 1 wherein each entry in said address filter table further includes a mask field for storing an address mask value for allowing said media access controller to selectively route data frames having a predetermined range of allowable destination addresses through each entry in said address filter table.

6. The apparatus of claim 1 wherein each entry in said address filter table further includes a perfect match field for indicating that the destination address contained in a received data frame identically matches the target address stored in the address field of a selected entry.

7. The apparatus of claim 1 wherein said destination address and said target address are each six bytes.

8. The apparatus of claim 1 wherein each entry in said address filter table is sixteen bytes.

9. A method of programming hardware resources in a network interface comprising the steps:

selecting an entry within an address filter table containing a plurality of entries;

writing a predetermined value into at least one field contained in the selected entry;

detecting initiation of the writing step;

invalidating an enable field contained in the selected entry to prevent access to the selected entry during routing operations;

detecting completion of the writing step; and validating the enable field contained in the selected entry to allow access to the selected entry during routing operations.

10. The method of claim 9 wherein the step of writing a predetermined value further comprises the steps:

writing a target address into an address field of the selected entry for comparison with a destination address of a received data frame during routing functions; and writing an address mask value into a mask field contained in the selected entry for selectively routing a predetermined range of destination addresses.

11. The method of claim 9 wherein the step of writing a predetermined value includes the step of writing a plurality of double words into the selected entry.

* * * * *